United States Patent [19]

Messervey et al.

[11] 3,774,092
[45] Nov. 20, 1973

[54] DRIVE SYSTEM OF SYNCHRONOUS MOTOROS SHARING A COMMON LOAD

[75] Inventors: William Albert Messervey; William Albert Wyeth; John Alexander Irwin Young, all of Peterborough, Ontario, Canada

[73] Assignee: Canadian General Electric Company Limited, Toronto, Ontario, Canada

[22] Filed: Mar. 8, 1972

[21] Appl. No.: 232,684

[30] Foreign Application Priority Data
Apr. 14, 1971 Canada.............................. 110245

[52] U.S. Cl. .................................... 318/99, 318/98
[51] Int. Cl. ............................................. H02p 7/68
[58] Field of Search ........................................ 318/99

[56] References Cited
UNITED STATES PATENTS

| | | | |
|---|---|---|---|
| 3,611,080 | 10/1971 | Herzog et al. ........................ | 318/99 |
| 3,688,167 | 8/1972 | Ivey et al. ............................. | 318/99 |
| 3,333,173 | 7/1967 | Durrwachter..................... | 318/99 X |

Primary Examiner—T. E. Lynch
Attorney—Raymond A. Eckersley, Frank L. Neuhauser, Oscar B. Waddell and Joseph B. Forman

[57] ABSTRACT

A drive comprising at least two electric synchronous motors coupled to a common load for driving it, and means for starting the motors and making them share the load. Each motor has a primary winding, i.e., an armature winding, which when energized with polyphase alternating current produces a synchronously rotating magnetic field, and a salient pole main field winding which when energized with direct current produces a steady state magnetic field that interacts with the rotating field so as to cause the rotor to rotate in synchronism with the rotating field. At least one of the motors has an auxiliary field winding distributed on the pole heads of the same magnetic pole structure as the main field winding. This winding is also energized with direct current and when so energized it produces a second steady state magnetic field having polar axes spaced angularly from the polar axes of the main field. These fields combine to produce a resultant greater than either one and situated on polar axes between the main and auxiliary axes. The resultant field governs the point at which the rotor locks in step with the rotating field. The motors having an auxiliary winding are started by connecting this winding to a resistor as in the case of a wound rotor induction motor. When synchronous speed is attained, the resistor is disconnected and the winding connected to an exciter-regulator which regulates the excitation currents according to motor load signals. The auxiliary field currents are controlled for holding the resultant field flux in one motor in a definite load sharing relation to the resultant field flux in the other motor. The system will also include overvoltage protection.

6 Claims, 5 Drawing Figures

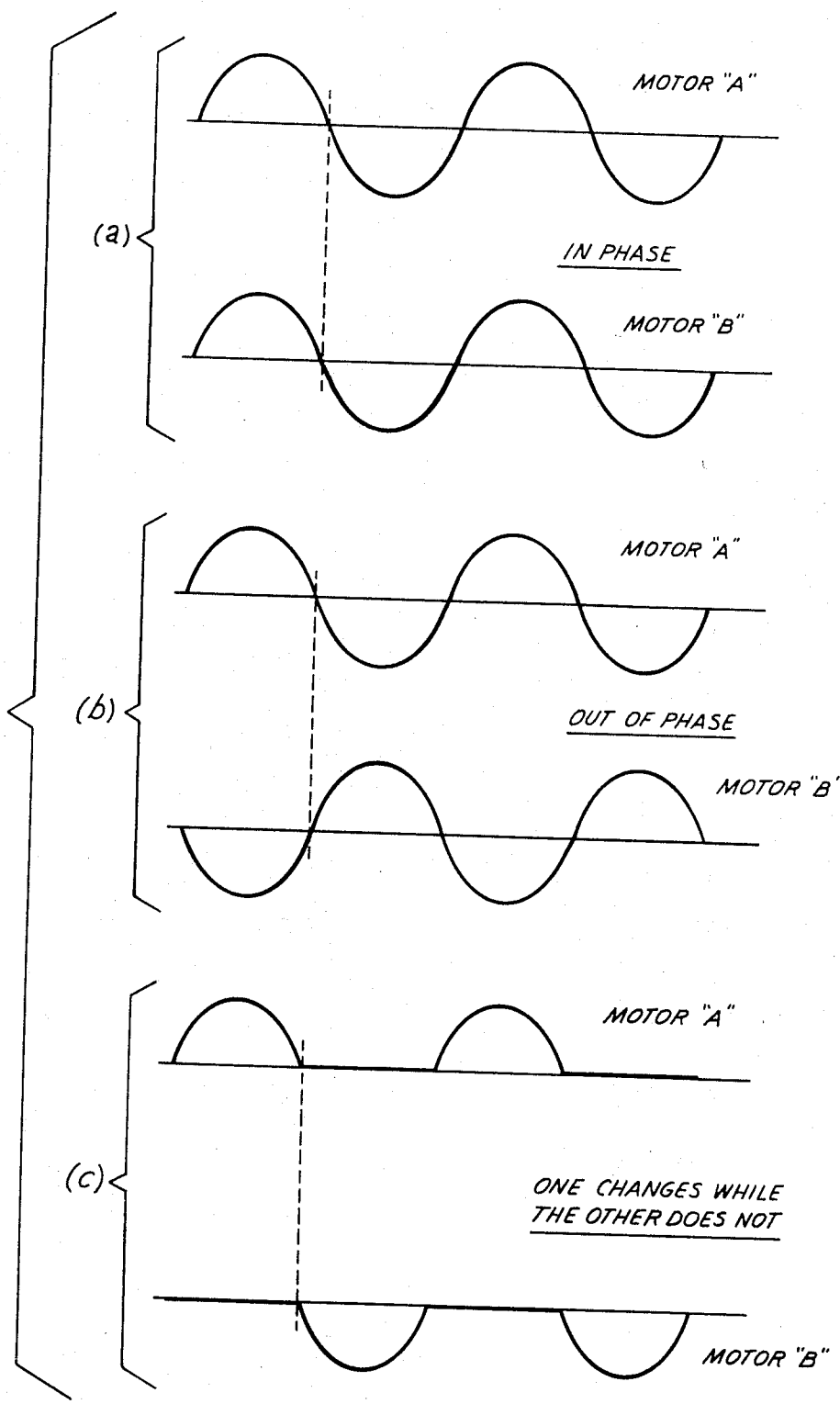

3,774,092

DRIVE SYSTEM OF SYNCHRONOUS MOTOROS SHARING A COMMON LOAD

This invention relates to a drive system of at least two synchronous motors coupled to a common load and the control for making them share the load.

Drives are known wherein two or more synchronous motors are coupled to drive a single load, two motors usually being used in this kind of drive. If the motors are to share the load properly between them, some means is necessary to make them do so. U.S. Pat. No. 3,553,552 dated Jan. 5, 1971, Gordon W. Herzog discloses a drive which has synchronous motors constructed for starting and load sharing so as to be well suited for use in the system of this invention. The particular drive illustrated in this application has two synchronous motors, and each motor has a primary winding, i.e., an armature winding, which when energized with polyphase alternating current produces a synchronously rotating magnetic field, and a field winding which when energized with direct current produces a steady state magnetic field that interacts with the rotating field so as to cause the rotor to rotate in synchronism with the rotating field. At least one of the motors has an auxiliary field winding on the same magnetic pole structure as the main field winding. This winding is also energized with direct current and when so energized it produces a second steady state magnetic field having polar axes spaced angularly from the polar axes of the main field. These fields combine to produce a resultant greater than either one and situated on polar axes between the main and auxiliary axes. The resultant field governs the point at which the rotor locks in step with the rotating field. To change this point, it is only necessary to change the direct current flowing in either one or both DC windings, preferably the auxiliary winding, so that the polar axes of the resultant flux shifts angularly. Load sharing between the motors depends on knowing the motor loads and using this information to set the relative values of the direct current flowing in the main and auxiliary windings.

The object of this invention is to provide a plural synchronous motor drive system in which the motors are readily started and made to share the load during synchronous operation. A further object is to provide fault protection for the system.

A system according to the invention comprises at least two synchronous motors coupled to a common load for driving it, and means for starting the motors and making them share the load. Each motor has a primary winding, i.e., an armature winding, which when energized with polyphase alternating current produces a synchronously rotating magnetic field, and a main field winding which when energized with direct current produces a steady state magnetic field of alternate north and south poles that interact with the rotating field to cause the rotor to rotate in synchronism with the rotating field. AT least one of the motors has a second field winding disposed on the same magnetic core structure as the main field winding. This second field winding will be referred to hereinafter in the disclosure as an auxiliary winding. It is also energized with direct current and when so energized it produces a second steady state magnetic field of alternate north and south poles having polar axes spaced angularly from the polar axes of the main field. These fields combine to produce a resultant greater than either one and situated on polar axes between the main and auxiliary axes. The resultant field governs the point at which the rotor locks in step with the rotating field, and shifting its axes change this point with respect to the rotor, thereby changing the load on the motor. The motors having an auxiliary winding are started by connecting this winding to a resistor and/or reactor as in the case of a wound rotor induction motor. In accordance with established practice, the main field windings are also connected to resistors during motor starting. When synchronous speed is attained, the resistors are disconnected and the winding energized. The motors with auxiliary windings have their field windings connected to regulating means which regulates the excitation currents according to motor load signals. The field currents are controlled for holding the resultant field flux in one motor in a definite load sharing relation to the resultant field flux in the other motor. The system will also include fault protection, e.g., over-voltage protection. By the expression steady state magnetic field as used herein is meant a field having a major steady state component and a minor unidirectional component which can be varied as required for motor load sharing and other control purposes.

A preferred embodiment of the invention will now be described with reference to the attached drawings. This particular embodiment illustrates the nature of the system, and it is not intended to limit the invention to any particular combination.

In the drawings

FIG. 4 is a diagram illustrating motor loadings; and

Figure 1:
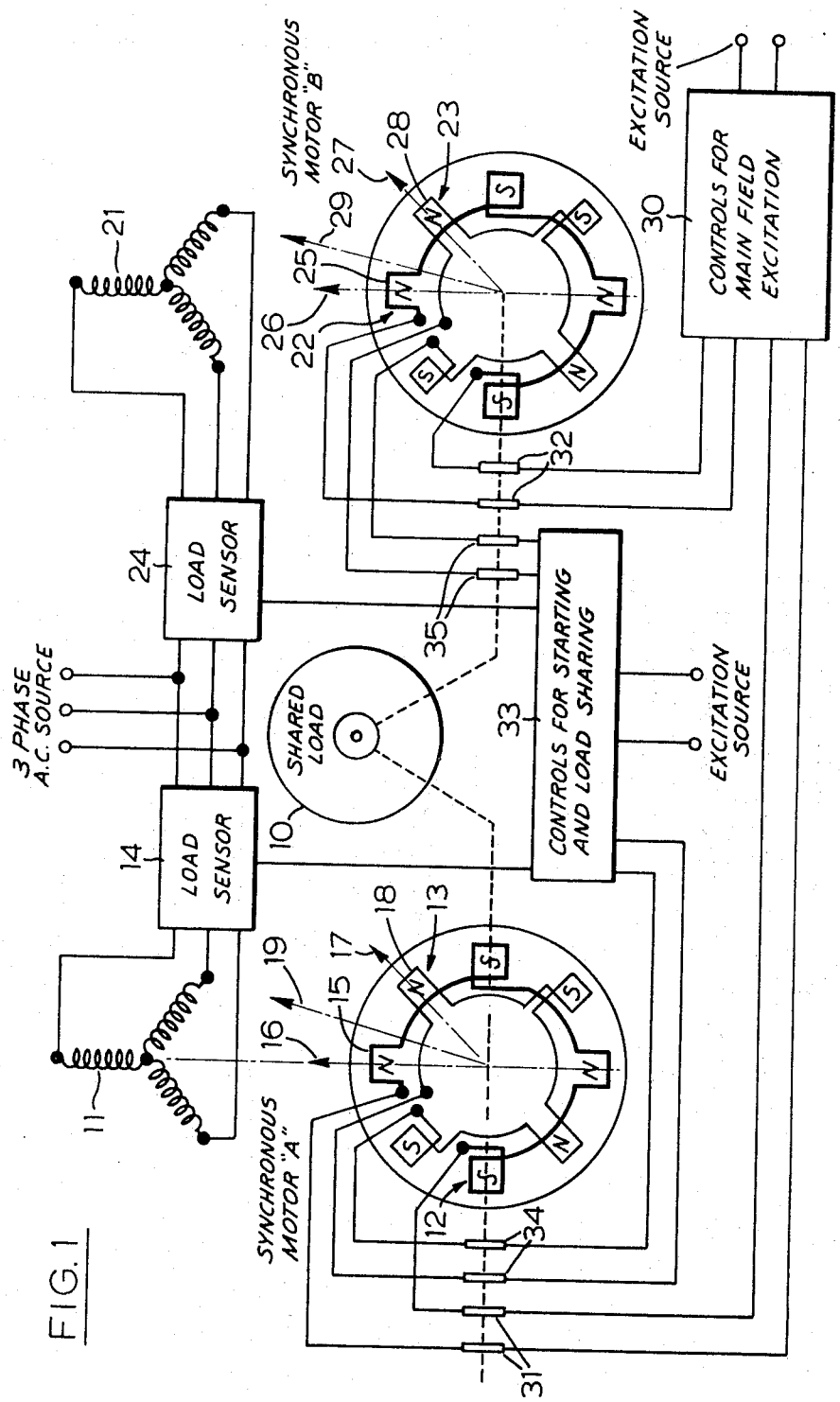
FIG. 1 is a diagram of two like synchronous motors coupled to a common load and a control system for the motors.

FIG. 1 illustrates diagrammatically two synchronous motors A and B coupled directly to a single load 10 so that both motors drive the load and share it between them according to the respective horsepower ratings of the motors. An example of such a drive is a large ore grinding mill driven by two synchronous motors, each of which has a pinion on its drive shaft meshing with a cogwheel on the mill drive shaft. Preferably, the two motors will have the same ratings, speeds, and operating characteristics, or as nearly so as they can be made. Different speed motors can, of course, be used with suitable gearing, but this tends to complicate the installation and will probably be little used.

Motor A is shown as a salient four pole synchronous motor which has a three phase AC armature winding 11 on its stator and two DC field windings 12 and 13 on its rotor, of which winding 12 is the main field winding and winding 13 is an auxiliary field winding displaced angularly with respect to the main field winding. The purpose and function of auxiliary winding 13 will be described later. Winding 11 is connected to a three phase AC source, e.g., a 60 cycle source, and when energized therefrom it produces a magnetic field which rotates at synchronous speed, in the case of 60 cycles at 1,800 RPM. The power that motor A draws from the AC source is measured by means of a load sensor 14 connected in the line to winding 11. Sensor 14 may be a contact making watt meter, a contact making ammeter, a watts transducer, an ampere transducer, etc. which senses the power input to the motor and therefore its output loading, or the share of load 10 taken by the motor.

The main field structure of motor A consists of a winding 12 having four field coils on four pole bodies which are spaced around the rotor core at 90° intervals. When energized with direct current, this winding produces a steady state magnetic field having the magnetic axes of the alternate north and south poles at 90° in space or 180 electrical degrees. Arrow 16 represents the direction and magnitude of the magnetic field of the upper north pole 15 and will be referred to hereinafter as its polar axis. The auxiliary winding 13 is also a four pole winding wherein the respective field coils are located with their coil axes between the axes of the coils of winding 12 in an alternate arrangement of main and auxiliary poles with the auxiliary poles spaced 90° apart and in quadrature with the main poles. When energized with direct current, the auxiliary winding produces another steady state magnetic field of alternate north and south poles displaced angularly with respect to the main poles. Arrow 17 represents the direction and magnitude of the magnetic field of the north pole 18 immediately to the right of main pole 15 and will be referred to hereinafter as its polar axis. When combined, fields 16 and 17 give a resultant field 19 located somewhere between poles 15 and 18 and of greater magnitude than either 16 or 17.

Motor B is the same as motor A, and the numerals 21 to 29 associated with motor B designate the same elements for it that numerals 11 to 19 do for motor A. In motor B arrow 26 represents the direction and magnitude of the magnetic field of the main north pole 25, arrow 27 the direction and magnitude of the magnetic field of the auxiliary north pole 28, and arrow 29 the resultant of the two.

For purposes of this discussion, polar axis 19 represents the point at which the rotor of motor A locks in step with the rotating field from armature winding 11, and polar axis 29 represents the point at which the rotor of motor B locks in step with the rotating field from armature winding 21. Axes 19 and 29 can be moved relative to the rotor of the respective motors by adjusting the direct currents flowing in either one or both of the field windings. For example, advancing axis 19 in the direction of rotation causes motor A to decrease its share of load 10, and retarding the axis causes the motor to increase its share of the load. The load on motor A can be determined by sensor 14 if it is not the proper share of load 10, it can be reset to the proper value by changing the auxiliary and/or main field currents. The load on motor B can be determined by sensor 24 and if it is not the proper share of load 10, it can be reset to the proper value by changing the auxiliary and/or main field currents. According to the preferred embodiment of the invention load sharing is accomplished by controlling the current flowing in the two auxiliary windings 13 and 23. The main field windings 12 and 22 are energized from an excitation source regulated by control unit 30. Winding 12 is connected to unit 30 via slip rings 31 and winding 22 via slip rings 32, and all four slip rings are mounted on the rotor shaft for rotation therewith. Auxiliary windings 13 and 23 are connected to a control unit 33 via slip rings 34 and 35 and this unit is connected to a source of electrical energy.

The rotor of each one of the motors A or B is a conventional salient pole magnetic core structure consisting of an even number of separate pole units projecting radially outward at equally spaced intervals around a central core. Each pole unit has a pole body connected to the core and a head on the outer end of the body terminating in a pole face. Each pole head contains a number of slots which extend axially of the rotor in spaced relation and radially inward from the pole face. In the conventional synchronous motor these slots contain the bars of the amortisseur winding.

Windings 12 and 22 are conventional salient pole windings, each winding consisting of a multi-turn coil for each pole unit. The coil surrounds the pole body between the core and the pole head, and the coils of a winding are interconnected electrically.

Each one of the auxiliary windings 13 and 23 may be a wave winding distributed over the pole faces of the salient pole rotor and retained in the slots in the pole heads, and it may be connected a balanced three phase wye winding. The auxiliary winding is distributed on the core in such a way in relation to the main field winding that when energized with direct current it produces alternate north and south magnetic poles having axes displaced angularly with respect to the axes of the magnetic poles of the main field, and during motor starting it serves as an AC secondary supplying current to a resistance and/or reactance to give the motor relatively high starting torque. A switching means connects the auxiliary winding to the resistance during motor starting, and once the pull-in speed is attained, i.e., nearly synchronous speed, it disconnects the resistance and connects the winding to a source of direct current. In effect the motor starts as a wound rotor induction motor and runs as a synchronous motor. The auxiliary windings are adapted to serve two purposes; (1) to shift the DC field by altering the current flowing in the auxiliary winding; and (2) to act as an AC secondary winding to provide torque during starting of the motor, i.e., start the motor as a wound rotor induction motor. A synchronous motor equipped with an auxiliary winding answering this description is disclosed in the applicants' above-referenced to application for patent, which motor may, of course, have a field core of either salient pole or cylindrical rotor construction. It is also to be noted that according to well established practice the main field windings of the motors will be connected to resistors during starting of the motors, and at the pull-in speed disconnected from the resistors and connected to the source of excitation current.

Figure 2:
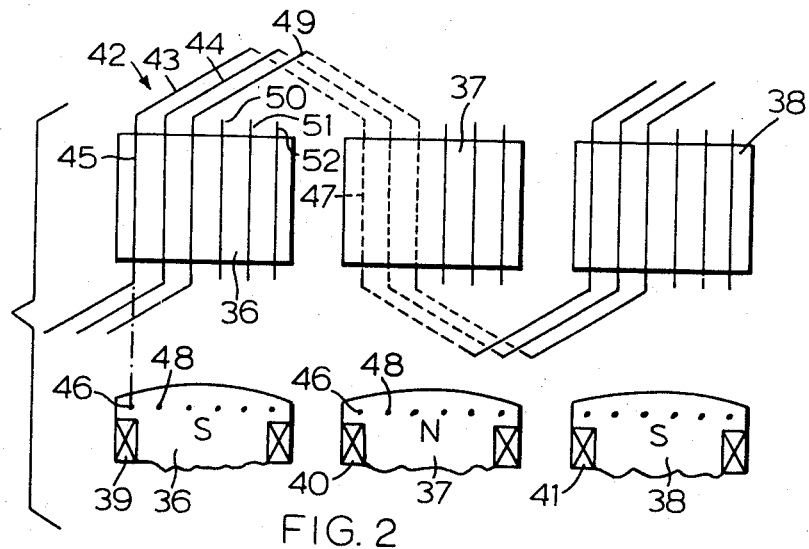
FIG. 2 is a diagram of a multi phase distributed auxiliary winding suitable for use in a drive of the type illustrated in FIG. 1.

Windings of the type disclosed in the above-referenced patent application and well suited for use in the combination of this invention are shown in FIG. 2. Coils for three salient poles 36, 37 and 38 of the main winding of a machine are shown at 39, 40 and 41 respectively, and the auxiliary winding at 42. The auxiliary winding is shown as a wave winding of two coil sides per slot. In practice, each coil such as 43 or 44 will consist of a plurality of insulated conductor turns formed into a coil having two sides located in corresponding slots of adjacent poles and end heads projecting axially from the pole heads. This is best illustrated in connection with coil 43 which is shown with one side 45 in the top half of slot 46 of pole 36 and the other side 47 in the bottom half of slot 46 of pole 37. The next coil 43 to the right also spans one pole pitch, extending from the top half of slot 46 of pole 37 to the bottom half of slot 46 of pole 38, and so forth for the remaining poles. There is one such coil 43 for each pole, and it extends from a slot 46 in one pole to a corresponding slot in the next pole, i.e., the span of each coil is equal to one pole pitch. Coils 43 progress to the right around the pole structure to form a ring of coils which begins with side 45 of the first coil in the top half of slot 46 of pole 36 and ends with side 47 of the last coil in the bottom half of slot 46 of pole 36. The adjacent coils 44 are identical to coils 43, and progress around the rotor in the same way in the next slots 48 to the right so as to form another ring of coils around the pole structure. Coils 43 and 44 are connected together, e.g., in series, in the proper sequence as one phase of a three phase winding such as phase 53 shown in FIG. 3. The next set of coils 49, 50 are the same as coils 43, 44 and are located around the pole structure in the same way in the next pair of slots to the right. They are connected together as phase 55 of FIG. 3. The third set of coils 51, 52 comprises phase 54.

Figure 3:
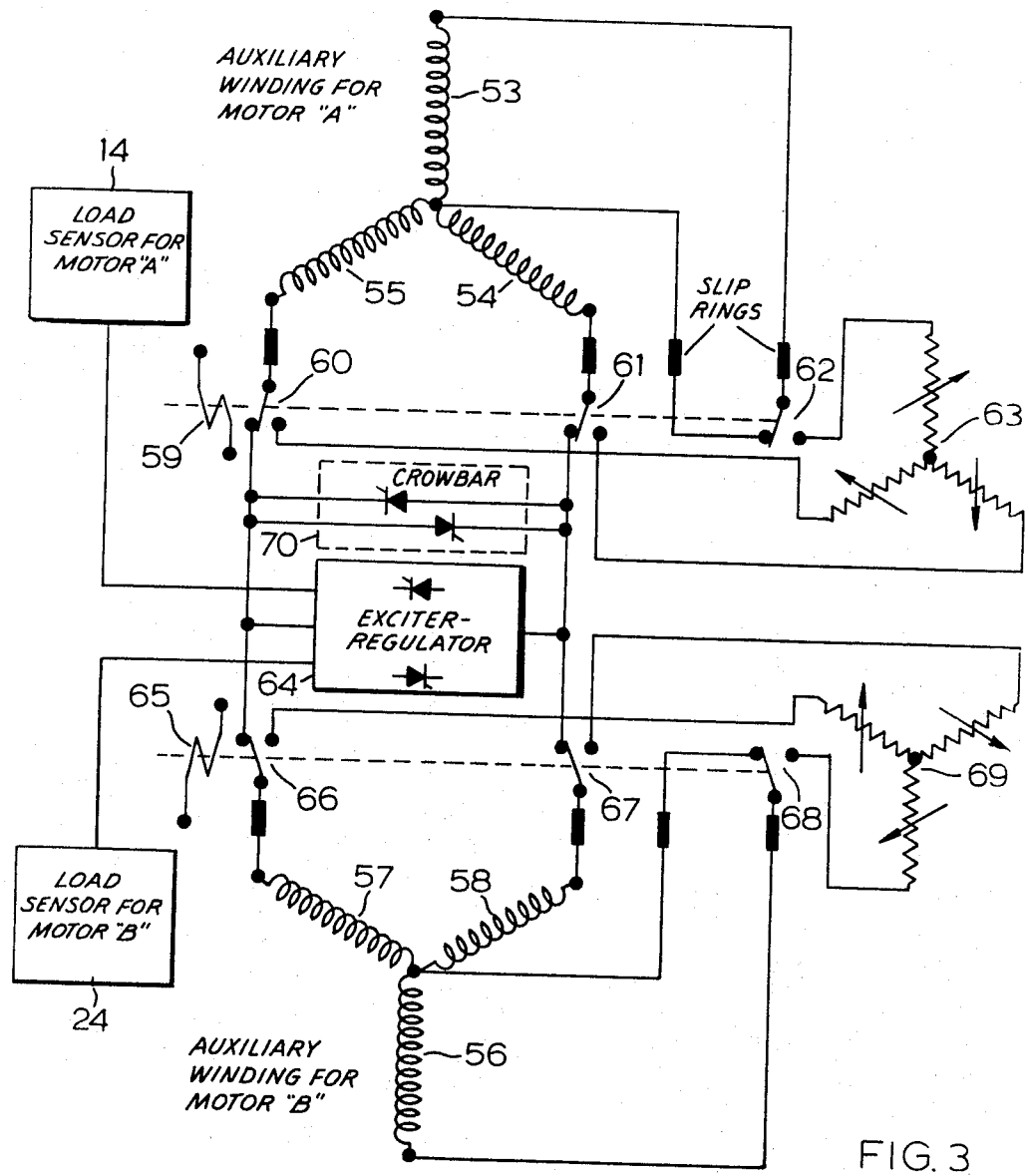
FIG. 3 is a diagram showing two distributed auxiliary windings and the controls therefor.

FIG. 2 illustrates a wave winding distributed over the pole faces of a salient pole rotor. This winding can be connected as a secondary for use with resistors to give the motor relatively high starting torque, or it can be connected to a source of excitation controlled by an exciter-regulator to provide an auxiliary magnetic field displaced with respect to the main field. FIG. 3 illustrates such a circuit. In this figure the auxiliary winding for motor A has three winding sections 53, 54 and 55 connected in a three phase wye configuration, and the auxiliary winding for motor B has three similar winding sections 56, 57 and 58 connected in another three phase wye configuration. A magnetic contactor 59 has three two position contacts 60, 61 and 62 which in one position of the contacts connect the auxiliary winding of motor A to a wye bank of resistors 63 for starting the motor or in the other position of the contacts, i.e., the position shown in FIG. 3, connects winding sections 54 and 55 to an exciter-regulator 64 and short circuits section 53 for synchronous operation of the motor. Another magnetic contactor 65 has three two position contacts 66, 67 and 68 which in one position of the contacts connect the auxiliary winding of motor B to a wye bank of resistors 69 for starting the motor or in the other position of the contacts connects winding sections 57 and 58 to exciter-regulator 64 and short circuits section 56 for synchronous operation of the motor. Since the two motors drive a common load, starting them and switching them over to synchronous operation will preferably be simultaneous. Resistors 63 and 69 may be variable resistors so that better control of starting is possible. Variable reactance reactors may be used in place of resistors 63 and 69. A crowbar 70 is shown connected across winding sections 54, 55 and 57, 58 in parallel with the exciter-regulator.

During starting of the motors, winding sections 54, 55 and 57, 58 will be disconnected from the regulator and the crowbar, the short circuits will be removed from section 53 and 56, and the auxiliary windings will be connected to resistors 63 and 69 so that the motors start in the same way as a wound rotor induction motor, with reasonably high starting torque. The main field windings are also connected to resistors during starting so that they contribute somewhat to the starting torque. Once the motors are up to a speed where they can pull into synchronism, the resistors are removed from the main windings and excitation current is applied to them. Immediately following this, the resistors are disconnected from the auxiliary windings and the circuit of FIG. 3 is restored. It is to be noted from FIG. 2 that the auxiliary winding is distributed on the pole heads in such a way that one or more of its sections can be energized to produce a steady state magnetic field of the same number of poles as the main field but displaced with respect thereto. Moreover, the distribution should allow for short circuiting a portion of winding, e.g., sections 53 and 56 of FIG. 3, so that this portion helps to stabilize synchronous operation in the way that the conventional amortisseur winding does. It is also desirable that the arrangement be such that the winding can be connected to a resistor for motor starting. Although a three phase starting circuit is shown in FIG. 3, it need not be so; other arrangements are possible. These other arrangements should be capable of producing a good auxiliary field displaced from the main field and good motor starting characteristics. Some stabilizing influences during synchronous operation are also desirable.

Referring again to FIG. 1, the polar axis 19 represents the point where the rotor of motor A locks in step with the rotating AC field at no load for example. If the motor is now loaded, this axis will lag a little behind the axis of the rotating AC field. This lag is referred to as the load angle. Since axis 19 represents the vector sum of the main and auxiliary fluxes, its position can be changed relative to the rotor by changing the current flowing in the auxiliary winding, and in so doing the motor can be made to either increase or decrease its share of the load. The same reasoning applies for axis 29 of motor B. Hence by maintaining the load angles of the two motors properly balanced through field current control the motors can be made to share the load.

FIG. 3 illustrates a system for controlling auxiliary field currents. This is a push-pull scheme where any adjustments in the auxiliary field currents occur to both motors in an opposite sense so that one motor sheds load while the other takes on load. Initially the main field currents are set for particular operating characteristics of the motors, and from then on they are under the control of controller 30, which may maintain them at constant values or adjust them as necessary to suit the operation of the drive. Sensors 14 and 24 continually measure the loads on motors A and B respectively and generate control signals representing the magnitudes of these loads. These signals are then compared in regulator 64, and if the comparison indicates an off balance in load sharing, the regulator restores balanced sharing by adjusting the auxiliary field currents. Regulating load sharing is a continuing process which occurs rapidly, but not so rapidly that the system becomes unstable. In addition to regulating the auxiliary field currents for motor load sharing, the regulator also helps to stabilize synchronous operation by providing a path for induced circulating currents.

Exciter-regulator 64 is a known type of device which includes a power supply and means for controlling this supply e.g., a feedback regulating system guided by the sensors. It may be a voltage regulator which indirectly through voltage regulates the current flowing in the auxiliary windings, or a current regulator. A suitable regulator is one which uses alternating current and phase controlled converters, e.g., thyristors, for converting the alternating current to unidirectional current suitable for excitation purposes. Firing of the converters is controlled by the signals from the load sensors so that the portions of the half cycles conducted comprise the field current necessary. The current source could be a DC generator, or some other known source.

FIG. 4 illustrates the movements of the load angles of two synchronous motors driving a large ore grinding mill. The mill is coupled to the motors by means of a large diameter ring gear on the mill that meshes with a small diameter pinion on the drive shaft of each motor. Variations in the size and composition of the charge in the mill, the roundness of the ring gear, and the meshing of the pinion with the ring gear will be reflected in the loading of the two motors. A change in the load on a motor will, of course, change its load angle. In FIG. 4, curves (a) illustrate a condition where the load angles of both motors are in phase, curves (b) a condition where they are completely out of phase, and curve (c) a condition where one changes while the other does not. The changes taking place in motor loading will make the load angles vary between these three conditions.

Figure 5:
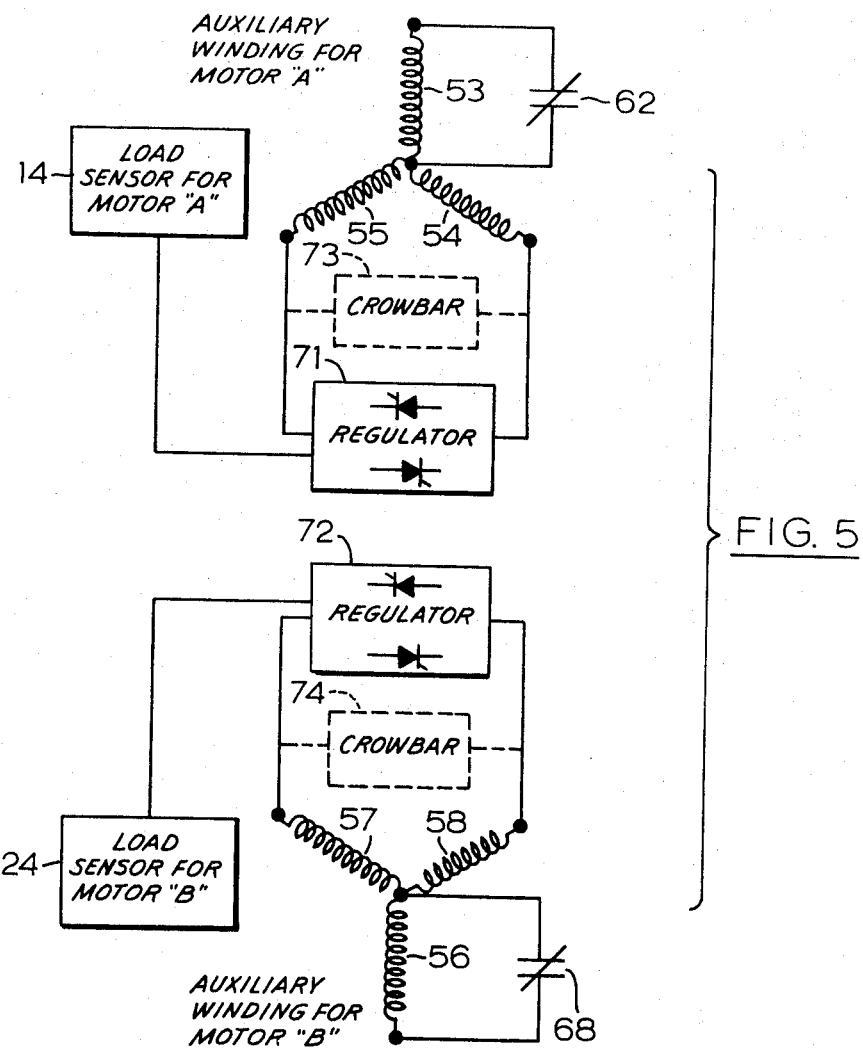
FIG. 5 is a diagram similar to FIG. 3 showing another control scheme.

The push-pull regulating system shown in FIG. 3 is well suited to correct the out of step load angles shown at (b) and (c) in FIG. 4 because by nature it makes simultaneous corrections in the auxiliary excitation of both motors in an opposite sense. However, as the load angles approach the condition shown at (a) where they are in phase the push-pull scheme becomes less effective. FIG. 5 illustrates a regulating system which is effective in regulating motor load sharing under all three of the conditions shown in FIG. 4.

In FIG. 5 winding sections 54 and 55 of motor A are connected to a regulator 71 and sections 57 and 58 of motor B to another regulator 72 for synchronous operation, and section 53 and 56 are short circuited as in the case of FIG. 3. Except for the use of two regulators in place of one, the circuit of FIG. 5 is the same as that shown in FIG. 3 and the mode of starting the motors is also the same. In the FIG. 5 configuration, each motor is regulated independently of the other, motor A by way of sensor 14 and regulator 71 and motor B by way of sensor 24 and regulator 72. As a result any one of the motors can be adjusted independently of the other for any one of the load angles illustrated in FIG. 4. As in the circuit of FIG. 3, a crowbar 73 is connected across winding sections 54, 55 in parallel with regulator 71, and another crowbar 74 is connected across winding sections 57, 58 in parallel with regulator 72.

In both circuits of FIGS. 3 and 5 a crowbar is provided to protect the regulator against overvoltages caused by faults in the drive system. Fault conditions can generate transient energies which could result in severe over voltages if the energy is not dissipated. A fault could cause voltage surges great enough to damage the thyristors and other semiconductors in the regulator. In effect, a crowbar is a switch which remains open during normal excitation voltages and closes at a predetermined overvoltage, placing a short circuit across the regulator and the winding sections connected to it while the overvoltage condition persists. The short circuit provided by the closed switch allows the energy of the surge to be dissipated in the winding sections, and as soon as the voltage drops to nearly normal, the switch opens again to remove the short circuit and let the regulator resume control. The regulator contains means for suppressing its output while short circuited. In the case of a regulator employing thyristors to control the field current, firing of the thyristors will be discontinued during the overvoltage condition. At the instant that the short circuit appears, the regulator may well be subjected to a surge in its output. However, this surge will be of such short duration that the impedance of the regulator will contain it until the suppressors take over.

A crowbar suitable for use in the present system may consist essentially of a pair of thyristors connected in parallel with the anode-cathode polarities of one opposite to the polarities of the other as indicated in FIG. 3 for crowbar 70 so that they conduct in both directions. The thyristors are provided with gating voltages directly related to the voltage across the winding sections. During normal operation this voltage is too low to render the thyristors conductive, but upon rising to a predetermined value representing an undesirable overvoltage it does render the thyristors conductive. When both thyristors are gated on, they short circuit the winding sections and thus protect the regulator by making a low resistance path available for current flow in either direction. This removes the regulator from the overvoltage and confines the overvoltage to the winding sections until its energy is spent.

In the embodiments of the invention described in connection with the drawings the output of each motor is obtained by measuring its input. It is also possible to measure the output of each motor directly by means of torsion couplings, strain gauges, etc. and use these measurements for control purposes. The components and circuits described are only those necessary for one skilled in the art to devise a drive system according to the invention. In actual practice, the system would, of course, incorporate additional components and circuits for purposes of control, protection, etc.

FIG. 3 shows a parallel arrangement of the auxiliary windings for synchronous operations. Other arrangements are possible, e.g., a series arrangement. However, these other arrangements must be capable of variations in control between windings and overvoltage protection.

In the case of FIG. 5, one of the motors could be a conventional synchronous motor, i.e., a synchronous motor without the auxiliary winding and controls therefor. Regulating load sharing between the motors would then be carried out by adjusting the load angle of the other motor only. The same degree of control would not now be expected, but the control possible may be adequate in some drive applications.

What we claim as new and desire to secure by Letters Patent of the United States is the following:

1. A drive system comprising two electric synchronous motors coupled to drive a common load for sharing thereof, each one of said motors having a stator core with a primary multiphase AC winding thereon and a rotor core with a multi-pole field winding thereon, a source of multiphase alternating current for energizing said AC winding to produce a primary magnetic field, a source of current for energizing said field winding to produce a main steady state magnetic field of alternate north and south poles which interacts with said primary magnetic field to cause synchronous rotation of said rotor, at least one of said motors having a second winding disposed on said rotor core so as to provide secondary winding for said primary winding for producing the major portion of the motor starting torque or when at least some portions of said second winding are energized provide an auxiliary steady state magnetic field of alternate north and south poles equal in number to said main north and south poles but displaced angularly therefrom, a source of current for energizing said second winding to produce said auxiliary steady state magnetic field, means for sensing the load on said at least one motor and providing signals representing the magnitude of the load sensed, regulator means reponsive to said signals having one means for regulating the current supplied to said field winding and another means for regulating the current supplied to said second winding, switching means for connecting said field and second windings to resistors and/or reactors for starting the motor or to the output terminals of said regulator means for synchronous operation of the motor, said regulator means regulating the relative values of the currents supplied to said field and second windings for a combined magnetic field which controls the load on said at least one motor so that this motor takes a definite share of said common load, and fault protective means connected to said output terminals for protecting said regulator means from fault energies in the system.

2. The drive system of claim 1 wherein said fault protective means comprises overvoltage protective means connected across the output of said other regulating means for protecting it from overvoltages emanating from said second winding.

3. The drive system of claim 2 wherein said fault protective means comprises a crowbar.

4. The drive system of claim 1 wherein said fault protective means comprises a pair of thyristors connected in parallel in an opposite polarity sense and the parallel combination connected across the output of said other regulating means, and means for gating said thyristors conductive in response to overvoltage in said second winding.

5. The drive system of claim 1 wherein the other motor has a second winding like said second winding of said at least one motor, and wherein said other regulating means comprises a push-pull regulator having its output connected to the respective second windings of the two motors.

6. The drive system of claim 5 wherein said fault protective means comprises a crowbar connected across the output of said push-pull regulator.

* * * * *